United States Patent
Kodama et al.

(10) Patent No.: US 8,250,735 B2
(45) Date of Patent: Aug. 28, 2012

(54) MOTOR ADOPTING IMPROVED MECHANISM

(75) Inventors: Mitsuo Kodama, Shizuoka-ken (JP); Yuji Omura, Shizuoka-ken (JP)

(73) Assignee: Alphana Technology Co., Ltd., Shizuoka (JP)

( * ) Notice: Subject to any disclaimer, the term of this patent is extended or adjusted under 35 U.S.C. 154(b) by 169 days.

(21) Appl. No.: 12/656,593

(22) Filed: Feb. 4, 2010

(65) Prior Publication Data

US 2010/0146772 A1 Jun. 17, 2010

Related U.S. Application Data

(62) Division of application No. 12/213,342, filed on Jun. 18, 2008, now abandoned.

(30) Foreign Application Priority Data

Jun. 29, 2007 (JP) ................................. 2007-171969

(51) Int. Cl.
*H02K 15/02* (2006.01)
(52) U.S. Cl. ..... 29/596; 29/598; 29/603.03; 29/894.362
(58) Field of Classification Search ............... 29/603.03, 29/596, 894.362, 598; 310/90
See application file for complete search history.

(56) References Cited

U.S. PATENT DOCUMENTS

| | | | | |
|---|---|---|---|---|
| 5,174,025 A | * | 12/1992 | Tasaki et al. | ............. 29/894.362 |
| 6,271,612 B1 | * | 8/2001 | Tanaka et al. | ................... 310/90 |
| 6,787,954 B2 | | 9/2004 | Yoshitsugu et al. | |
| 7,372,663 B2 | | 5/2008 | Leblanc et al. | |
| 2001/0045782 A1 | | 11/2001 | Lieu et al. | |
| 2002/0117909 A1 | | 8/2002 | Gomyo | |
| 2004/0104634 A1 | | 6/2004 | Nishimura et al. | |
| 2004/0184188 A1 | | 9/2004 | Asada et al. | |

FOREIGN PATENT DOCUMENTS

| | | |
|---|---|---|
| JP | 2003-338102 | 11/2003 |
| JP | 2001-245461 | 9/2004 |

* cited by examiner

*Primary Examiner* — Livius R Cazan
(74) *Attorney, Agent, or Firm* — Louis Woo

(57) ABSTRACT

A motor adopting an improved mechanism is composed of a stator having a shaft and a rotor provided with a sleeve and a hub, wherein the shaft is inserted into the hub and the hub is fixed on an outer circumferential surface of the sleeve. The outer circumferential surface of the sleeve is provided with a first outer circumferential surface, a second outer circumferential surface and a receiving surface that links between the first and second outer circumferential surfaces. The hub is provided with a base section, a through hole and a first protruded section protruding downward from the base section. A tip end portion of the first protruded section is provided with a hitting surface that contacts with the receiving surface of the sleeve and a second protruded section that links to the contacting surface and protrudes downward from the contacting surface.

3 Claims, 7 Drawing Sheets

MOTOR ADOPTING IMPROVED MECHANISM

This application is a divisional of U.S. patent application Ser. No. 12/213,342, now abandoned, filed Jun. 18, 2008.

BACKGROUND OF THE INVENTION

1. Field of the Invention

This invention relates to a motor adopting an improved mechanism, particularly, relates to a motor of which hub is formed from a metal plate through a press working.

2. Description of the Related Art

A motor is commonly installed in a disc driving unit that drives a disc such as a hard disc and an optical disc to rotate.

It has been strongly required for such a disc driving unit to be thinner in thickness and lower in price as a portable disc driving unit such as a portable disc drive and a portable music player has been popularized recently.

As a matter of course, such a requirement has been also directed toward a motor to be installed in such a disc driving unit.

It has been commonly applied for a conventional motor that a rotor hub of the motor was produced from a rod stock of aluminum through a cutting process. In this regard, there has been a limit to thinning in thickness and lowering in price. In this connection, a rotor hub is generically referred to as "hub" in some cases.

Accordingly, in order to contribute to the above-mentioned market demand, various technologies for producing a rotor hub from a thin metal plate through a press working have been proposed. Some examples of such a technology are disclosed in the Japanese publication of unexamined patent applications No. 2003-338102 and No. 2001-245461 that was filed by the same inventor as the present invention.

The motors disclosed in the Japanese publication of unexamined patent applications No. 2003-338102 and No. 2001-245461 are a so-called shaft rotating type motor. In such a shaft rotating type motor, a radial bearing section such as a sleeve that supports a shaft axially is fixed to a stator side.

Further, both the shaft, which is supported by the radial bearing section so as to be rotatable freely, and a rotor hub, which is fixed to an outer circumferential surface of the shaft, rotate as a rotor.

In the meantime, when the rotor hub that is formed by the press working is fixed to the outer circumferential surface of the shaft, it is essential for the rotor hub to be provided with some amounts of engaging length with respect to the shaft along an axis of revolution of the shaft so as to obtain prescribed fixing strength between the rotor hub and the shaft or a prescribed degree of orthogonality with respect to the shaft.

In order to achieve an enough amount of engaging length, a through hole having a protruding section in a cylindrical shape is formed in the center of the rotor hub so as to engage the through hole of the rotor hub with the outer circumferential surface of the shaft.

Further, a bearing or an outer peripheral section of a sleeve is engaged with the through hole of the rotor hub.

More specifically, in the case of the Japanese publication of unexamined patent applications No. 2003-338102, a projected holding part 1c (see Abstract, FIG. 3 and paragraph [0019] in column 5) is equivalent to the above-mentioned protruding section of the rotor hub.

FIG. 7 is a cross sectional view of a conventional motor according to the prior art or the Japanese publication of unexamined patent applications No. 2001-245461.

Further, in the case of the Japanese publication of unexamined patent applications No. 2001-245461, as shown in FIG. 7, a holding section 106 in a cylindrical shape, which is formed on a rotor hub 105 and engages with a shaft 102, is equivalent to the above-mentioned protruding section of the rotor hub.

In such a structure of the rotor hub in which the protruding section of the rotor hub engages with the outer circumferential surface of the shaft, increasing an engaging length between the protruding section and the shaft is one method for improving the engaging strength and for obtaining the degree of orthogonality with a high degree of accuracy. However, the structure of the rotor hub creates a problem such that the motor results in increasing in total thickness.

On the contrary, in case of increasing the engaging length between the protruding section and the shaft without increasing total thickness of the motor, an engaging length between a radial bearing and a shaft is obliged to be shortened, and resulting in generating another problem such that the radial bearing fails to exhibit its primary performance and life of the bearing is shortened.

In other words, the other problem deteriorates dynamic characteristics of the motor and results in shortening the life of the motor.

Further, the rotor hub is provided with a flat surface on which a disc is mounted directly or through a member such as a sheet (hereinafter the "flat surface" is referred to as "disc mounting surface"). A location of the disc mounting surface in an axial direction affects a position of a disc surface directly, so that the location of the disc mounting surface must be positioned with a high degree of accuracy.

With respect to the disc mounting surface, in the Japanese publication of unexamined patent applications No. 2003-338102, a disk receiver 1b is exhibited as the disc mounting surface. In the case of the Japanese publication of unexamined patent applications No. 2001-245461, a flat surface 107 is shown as the disc mounting surface in FIG. 7.

However, the protruding section is formed by a burring process during the press working, so that an interval between a top surface of a flat section of the disc mounting surface and a tip of the protruded section is hardly obtained with a high degree of accuracy.

Accordingly, it is difficult to determine the location of the rotor hub in the axial direction in relation to the shaft with a high degree of accuracy.

Generally, in a disc driving unit, it is essential for an optical pickup or a head to be disposed without slanting with respect to a disc mounted thereon as far as possible. In this regard, it is desirable for a height or a location in the axial direction of the hub having the disc mounting surface to be determined with a high degree of accuracy.

SUMMARY OF THE INVENTION

Accordingly, in consideration of the above-mentioned problems of the prior arts, an object of the present invention is to provide a motor adopting an improved mechanism, which enables to be thinned in thickness and lowered in price, and further the motor never diminishes dynamic characteristics or shortens life of the motor.

In order to achieve the above object, the present invention provides, according to an aspect thereof, a motor adopting an improved mechanism comprising: a stator having a shaft; and a rotor provided with a sleeve into which the shaft is inserted and a hub fixed on an outer circumferential surface of the sleeve, wherein the rotor rotates with centering an axis of the shaft, and wherein the outer circumferential surface of the sleeve is provided with a first outer circumferential surface having a first diameter, a second outer circumferential surface having a second diameter that is larger than the first diameter, and a receiving surface that links between the first outer circumferential surface and the second outer circumferential surface and intersects with the shaft at right angles, and wherein the hub is provided with a base section that extends in a direction intersecting with an axis of the shaft at right angles, a through hole that is formed in the center of the base section and engages with the outer circumferential surface of the sleeve, and a first protruded section that protrudes downward from the base section in the through hole side in parallel with the axis of the shaft, and further wherein a tip end portion of the first protruded section is a surface intersecting with the axis of the shaft at right angles and provided with a hitting surface that contacts with the receiving surface of the sleeve and a second protruded section that links to the contacting surface and protrudes downward from the contacting surface in an opposite direction toward the base section.

Other object and further features of the present invention will be apparent from the following detailed description when read in conjunction with the accompanying drawings.

DETAILED DESCRIPTION OF THE INVENTION

In the present invention, a rotor hub is defined as "hub".

First Embodiment

In reference to FIGS. 1-5, a motor adopting an improved mechanism according to a first embodiment of the present invention is described in detail.

A motor according to the first embodiment of the present invention is a disc driving motor, which is installed in a disc driving unit and drives a hard disc to rotate.

Figure 1:
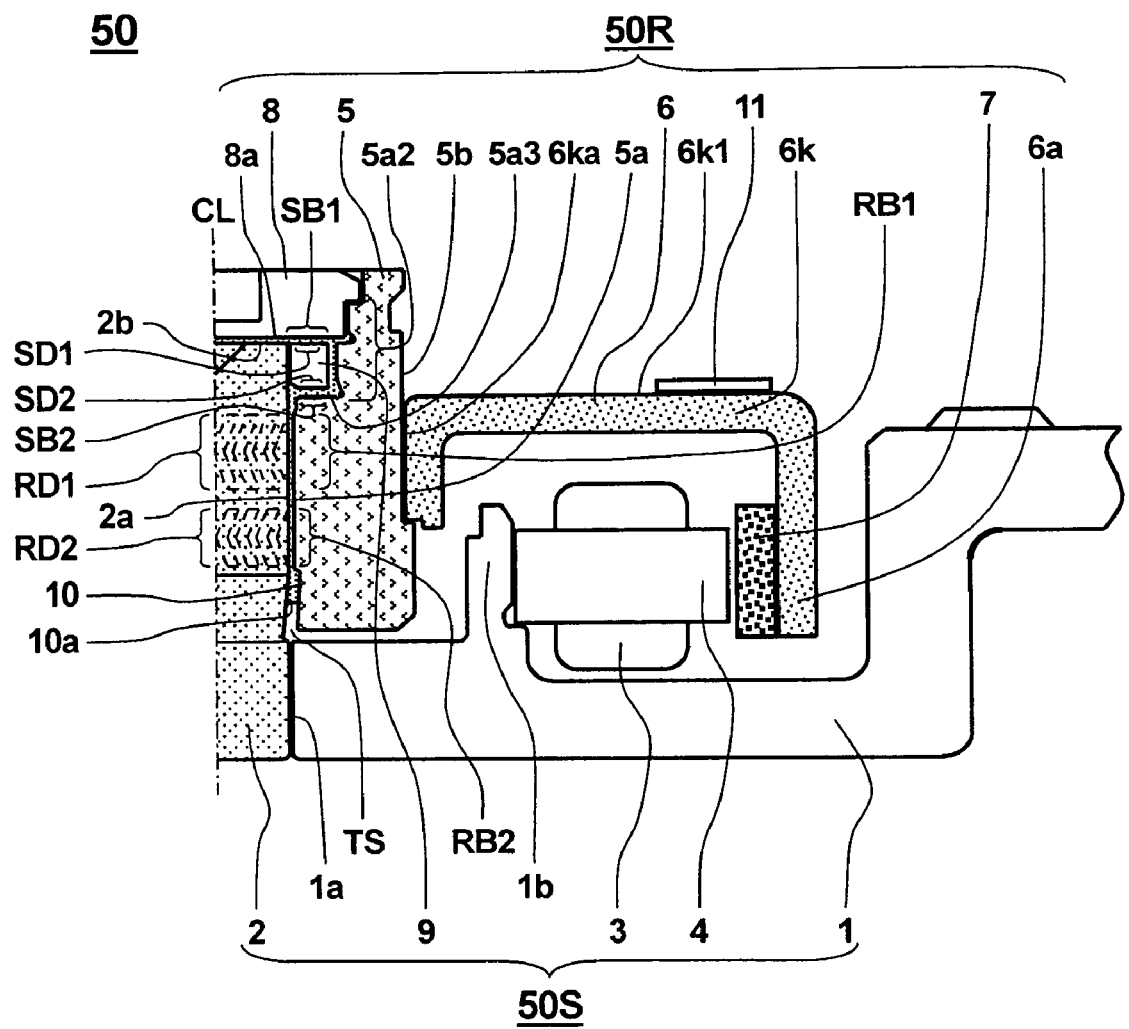
FIG. 1 is a cross sectional view of a motor adopting an improved mechanism according to a first embodiment of the present invention showing just one side of the motor symmetrical to an axis of revolution.

FIG. 1 is a cross sectional view of a motor adopting an improved mechanism according to a first embodiment of the present invention.

Figure 2:
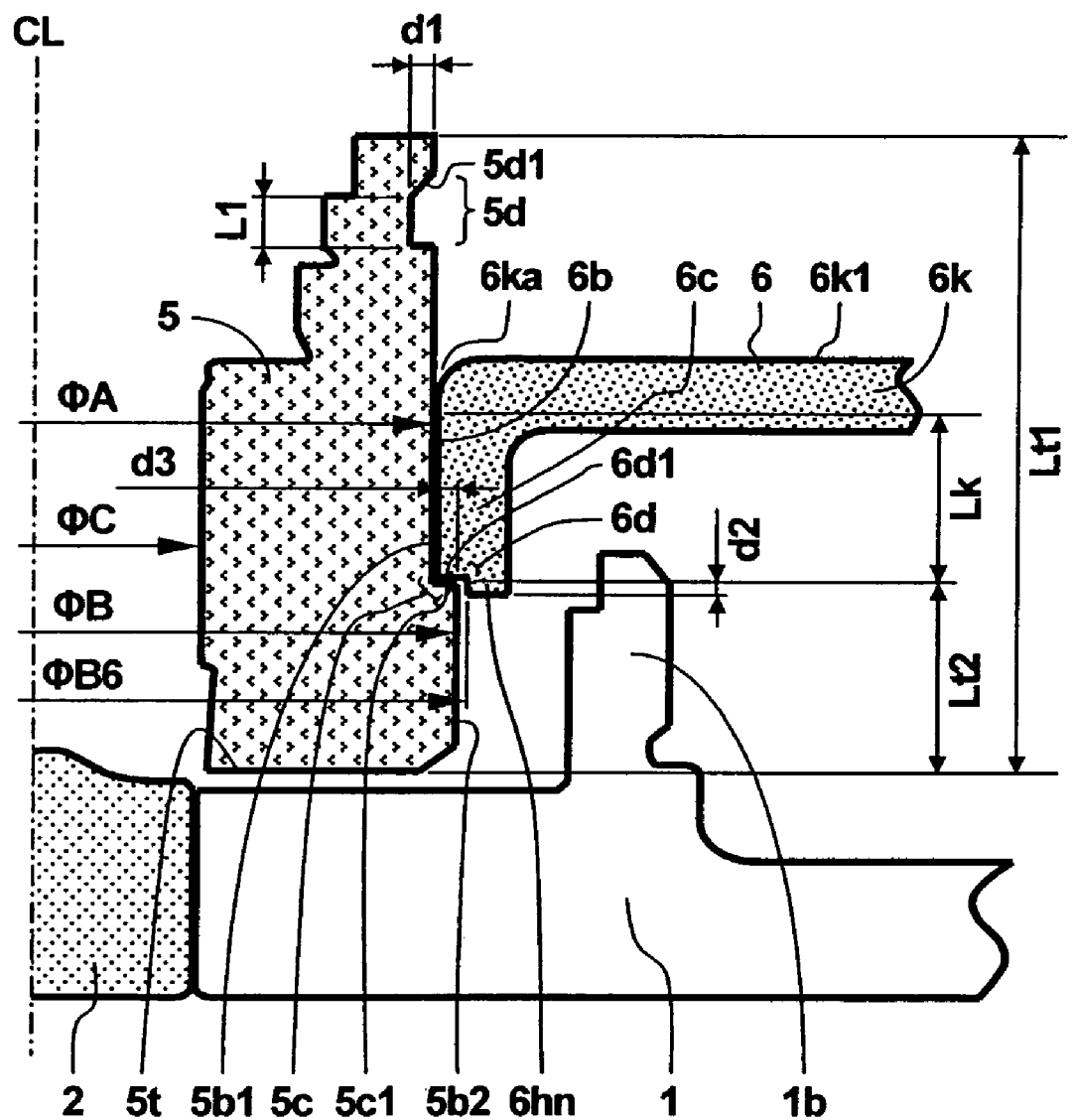
FIG. 2 is an enlarged cross sectional view in part of a major part of the motor shown in FIG. 1.

FIG. 2 is an enlarged cross sectional view in part of a major part of the motor shown in FIG. 1.

Figure 3A:
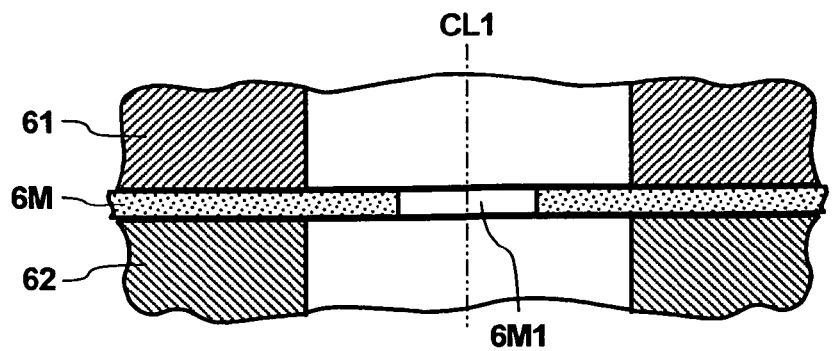
FIG. 3a is a cross sectional drawing for explaining a first step of forming a hub through a press working.
Figure 3B:
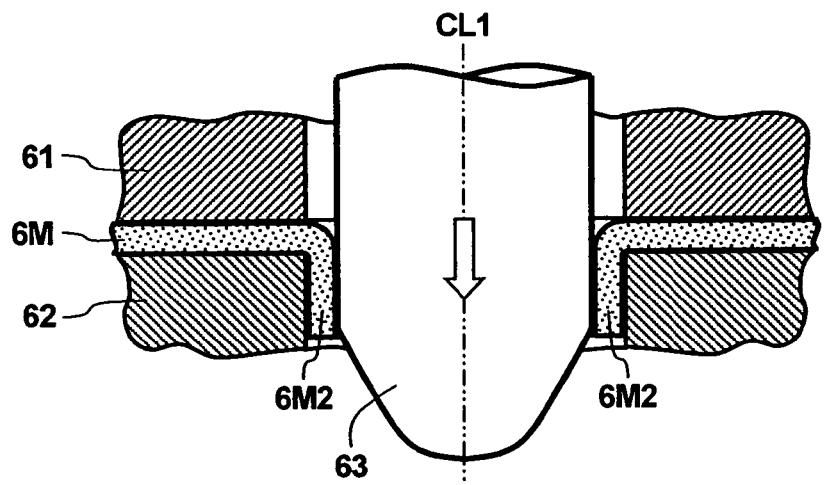
FIG. 3b is a cross sectional drawing for explaining a second step of forming the hub through the press working.
Figure 3C:
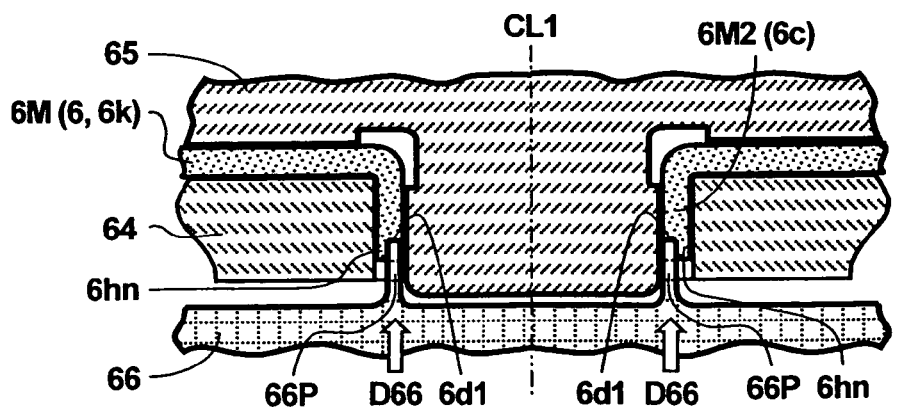
FIG. 3c is a cross sectional drawing for explaining a third step of forming the hub through the press working.

FIGS. 3a-3c are cross sectional drawings for explaining each step of forming a hub through a press working.

Figure 4:
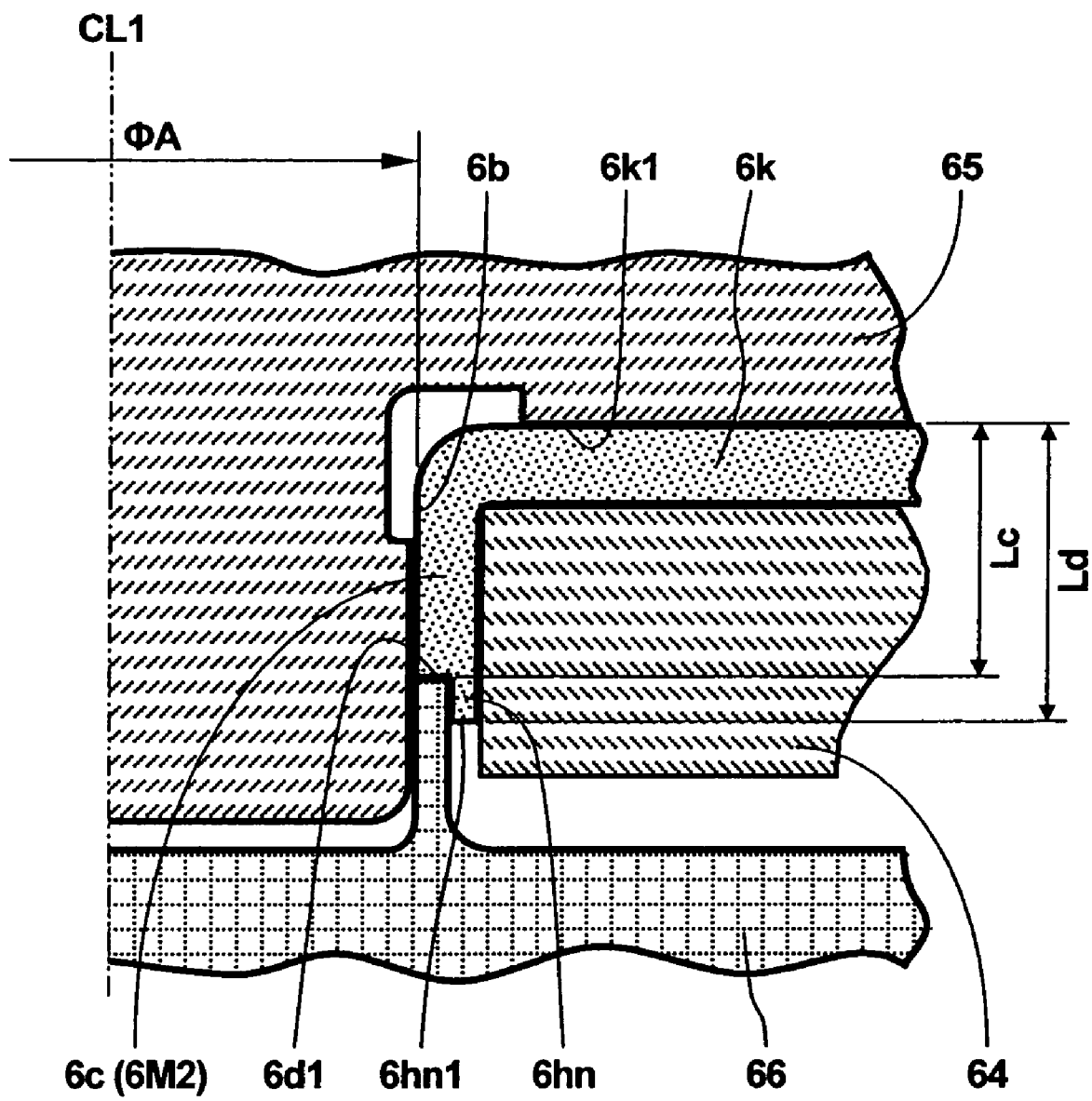
FIG. 4 is an enlarged cross sectional drawing in part showing a right side of the third step of forming the hub shown in FIG. 3c.

FIG. 4 is an enlarged cross sectional drawing in part showing a right side of the third step of forming the hub shown in FIG. 3c.

Figure 5:
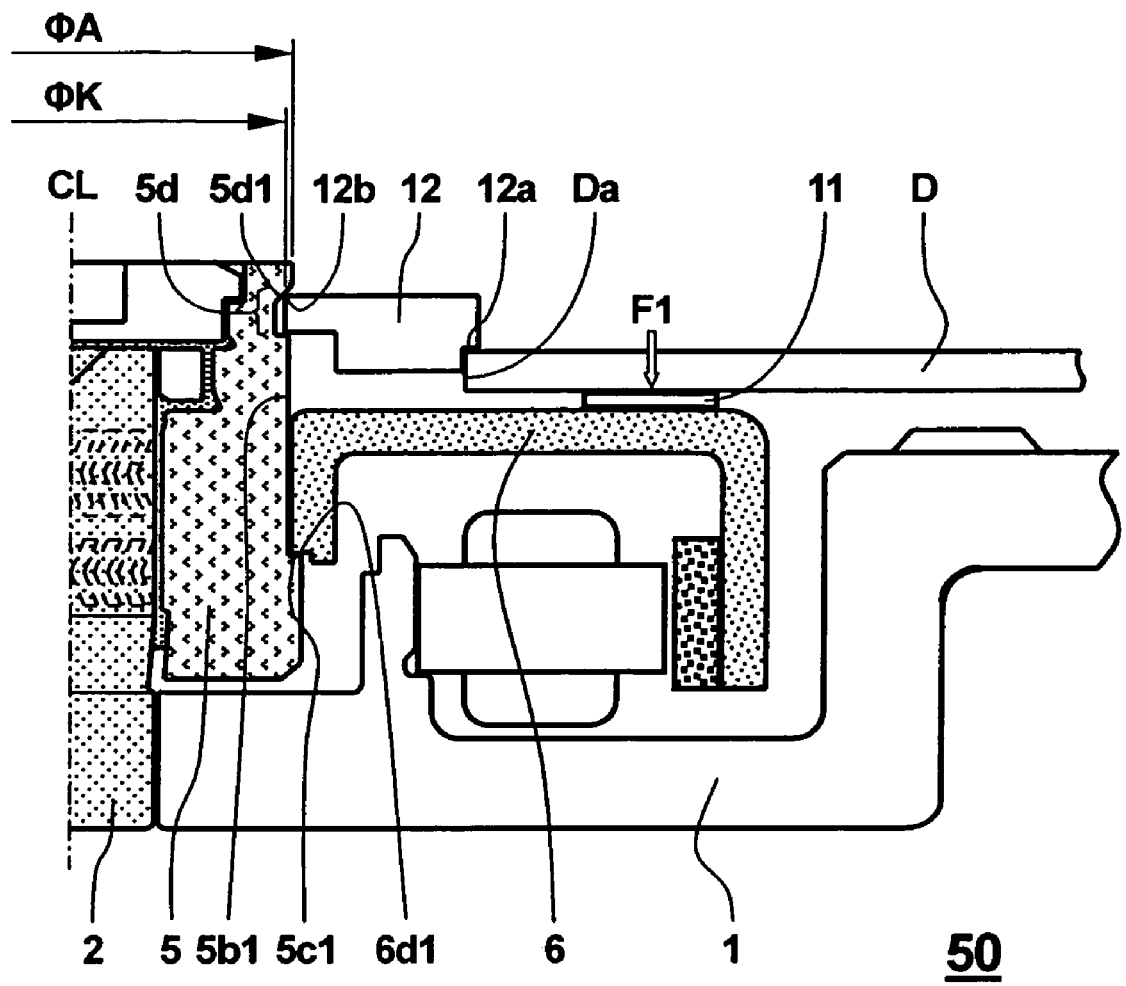
FIG. 5 is a cross sectional view of the motor shown in FIG. 1 when a disc is loaded thereon.

FIG. 5 is a cross sectional view of the motor shown in FIG. 1 when a disc is loaded thereon.

In FIGS. 1, 2 and 5, a cross section of a motor adopting an improved mechanism is symmetrical to an axis CL of revolution, so that each drawing shows just right half of the motor and is generically referred to as a cross sectional view of the motor.

In FIG. 1, a motor 50 is composed of a stator 50S and a rotor 50R.

As shown in FIG. 1, the stator 50S is further composed of a motor base 1, a shaft 2, a coil 3, a core 4 and a thrust ring 9. The shaft 2 is force fitted into a through hole 1a provided on the motor base 1. The coil 3 is wound around the core 4. The core 4 is fixed to an outer circumferential surface of an annular wall section 1b formed on the motor base 1. The thrust ring 9 is fixed to one tip end portion of the shaft 2 opposite to the motor base 1 side.

Further, the motor base 1 is formed from aluminum through a diecasting process and the shaft 2 is produced from a stainless steel material through a cutting process.

Furthermore, the thrust ring 9 is also produced from a stainless steel material through a cutting process.

On the other hand, the rotor 50R is further composed of a sleeve 5 having a through hole 5a, a hub 6, a ring magnet 7 and a counter plate 8. The hub 6 is glued to an outer circumferential surface 5b of the sleeve 5 or glued to the sleeve 5 after the sleeve 5 is force fitted in a through hole 6ka of the hub 6. The ring magnet 7 is fixed on an inner wall surface of a circumferential wall 6a of the hub 6, wherein the circumferential wall 6a extends downward from an outer circumference of a base section 6k of the hub 6. The counter plate 8 is installed on a stepped section 5a2 having a plurality of steps that is provided on a top end portion of the sleeve 5 so as to plug an opening hole of the through hole 5a.

Further, the sleeve 5 is produced from a copper based material, a stainless steel material or an aluminum based material through a cutting process. The hub 6 is produced from a one-millimeter-thick metal plate of a magnetic body such as an iron based material and a magnetic stainless steel material through a press working. The counter plate 8 is produced from a stainless steel material through a cutting process.

Furthermore, a sheet 11 made from resin is affixed on a top surface 6k1 of the base section 6k of the hub 6. The sheet 11 is provided for preventing a disc from being scratched by the hub 6 when the disc is loaded on the motor 50. The sheet 11 can be made from a polyester resin film having a thickness of 0.1 mm, for instance.

More, one pair of radial dynamic pressure grooves RD1 and RD2 is formed on an outer circumferential surface 2a of the shaft 2, wherein the dynamic pressure grooves RD1 and RD2 are disposed so as to be apart from each other in an axial direction of the axis CL of revolution.

Moreover, thrust dynamic pressure grooves SD1 and SD2 are formed on top and bottom surfaces of the thrust ring 9 respectively.

The above-mentioned components of the motor 50 are assembled such that the shaft 2 is inserted into the through hole 5a of the sleeve 5.

Further, the thrust ring 9 is sandwiched between the counter plate 8 and the sleeve 5 so as to remain a gap (second gap) between the bottom surface of the thrust ring 9 and a base surface 5a3 of the stepped section 5a2 of the sleeve 5 and another gap (fourth gap) between a bottom surface 8a of the counter plate 8 and the top surface of the thrust ring 9.

Hereupon, lubricant 10 is filled in a gap route that goes from a taper seal section TS to a gap between a top surface 2b of the shaft 2 and the bottom surface 8a of the counter plate 8 as a remotest section of the gap route through a first gap between the outer circumferential surface 2a of the shaft 2 including the radial dynamic pressure grooves RD1 and RD2 and an inner circumferential surface of the sleeve 5, the second gap between the base surface 5a3 of the sleeve 5 and the bottom surface of the thrust ring 9 including a thrust dynamic pressure groove SD2, a third gap between the sleeve 5 and an outer circumferential surface of the thrust ring 9 and the fourth gap between the top surface of the thrust ring 9 including a thrust dynamic pressure groove SD1 and the bottom surface 8a of the counter plate 8 as the remotest section of the gap route.

The taper seal section TS is a sealing section for preventing the lubricant 10 from leaking out from the gap route by means of physical action such as the capillary phenomenon. In this connection, a fluid level 10a of the lubricant 10 is designated to be positioned in the middle of the taper seal section TS.

Further, radial dynamic pressure bearing sections RB1 and RB2 are constituted by the radial dynamic pressure grooves RD1 and RD2 and their confronting surface of the sleeve 5, that is, the inner circumferential surface of the through hole 5a of the sleeve 5 and the lubricant 10 filled in the first gap between them.

Furthermore, a first thrust dynamic pressure bearing section SB1 is constituted by the thrust dynamic pressure groove SD1 and its confronting surface, that is, the top surface of the thrust ring 9 formed with the thrust dynamic pressure groove SD1 and the bottom surface 8a of the counter plate 8 and the lubricant 10 filled in the fourth gap between them.

More, a second thrust dynamic pressure bearing section SB2 is constituted by the thrust dynamic pressure groove SD2 and its confronting surface, that is, the bottom surface of the thrust ring 9 formed with the thrust dynamic pressure groove SD2 and the base surface 5a3 of the sleeve 5 and the lubricant 10 filled in the second gap between them.

In the motor 50 in which the stator 50S and the rotor 50R are assembled as mentioned above, the rotor 50R starts to rotate when prescribed electricity is supplied to the coil 3 from outside of the motor 50.

In this regard, the rotor 50R is supported so as to be rotatable freely with respect to the stator 50S while the rotor 50R is floated by dynamic pressure generated by each of the thrust and radial dynamic pressure bearing sections RB1, RB2, SB1 and SB2 as the rotor 50R rotates.

In reference to FIG. 2, a structure of fixing the hub 6 to the sleeve 5 is described in detail next.

FIG. 2 shows partially a major part of the motor 50 in FIG. 1.

In FIG. 2, "ΦA" denotes a first outer diameter of a first outer circumferential surface 5b1 of the sleeve 5, "ΦB" denotes a second outer diameter of a second outer circumferential surface 5b2 of the sleeve 5, "ΦC" denotes an inner diameter of the through hole 5a of the sleeve 5 and "Lt1" denotes a total length in the axis CL direction of the sleeve 5.

Further, as shown in FIG. 2, the outer circumferential surface 5b is constituted by the first outer circumferential surface 5b1 having the first outer diameter ΦA and the second outer circumferential surface 5b2 having the second outer diameter ΦB, wherein the second outer diameter ΦB is larger than the first outer diameter ΦA by a difference d3.

Furthermore, a location of a boundary section between the first and second outer circumferential surfaces 5b1 and 5b2 of the sleeve 5 is positioned at a distance Lt2 from a bottom end surface 5t of the sleeve 5. The boundary section is a stepped section 5c having a receiving surface 5c1, which intersects with the axis CL at right angles.

More, a circumferential groove 5d is formed on the top end portion of the sleeve 5 opposite to the bottom end surface 5t confronting with the motor base 1.

More specifically, a length or a width in the axis CL direction of a deepest section of the circumferential groove 5d is "L1" and a depth of the circumferential groove 5d from the first outer circumferential surface 5b1 is "d1".

Moreover, a wall surface 5d1 is provided at an upper edge portion of the circumferential groove 5d as a slanted surface, wherein the wall surface 5d1 is inclined so as to increase a width in the axis CL direction of the circumferential groove 5d in accordance with a distance from the deepest section toward the first outer circumferential surface 5b1. An angle of gradient of the wall surface 5d1 is 45 degrees, for instance, with respect to the axis CL.

Typical values of the above-mentioned dimensions, for instance, are as follows:

"ΦA"=10.0 mm, "ΦB"=11.0 mm, "ΦC"=3 mm, "L1"=0.7 mm, "d1"=0.4 mm, "Lt1"=9.8 mm and "Lt2"=3 mm.

On the other hand, as shown in FIG. 2, the hub 6 is provided with the through hole 6ka in the center, wherein the through hole 6ka tightly engages with the first outer circumferential surface 5b1 having the first outer diameter ΦA of the sleeve 5.

Further, the hub 6 is provided with a protruded section 6c (hereinafter referred to as "first protruded section 6c"), which protrudes downward from the base section 6k of the hub 6 in the through hole 6ka side in parallel with the shaft 2.

Furthermore, an inner circumferential surface 6b of the first protruded section 6c also tightly engages with the first outer circumferential surface 5b1 having the first outer diameter ΦA of the sleeve 5.

More, the first protruded section 6c is formed by a burring process during a press working. The forming process of the first protruded section 6c will be detailed.

Moreover, a stepped section 6d having a shape corresponding to the stepped section 5c of the sleeve 5 is formed on a tip end portion of the first protruded section 6c.

More specifically, the tip end portion of the first protruded section 6c, which is a surface that intersects with the axis CL at right angles, is provided with a hitting surface 6d1, which contacts with the receiving surface 5c1 of the sleeve 5, and a thin cladding section 6hn (hereinafter referred to as "second protruded section 6hn"), which protrudes downward toward the motor base 1 from the hitting surface 6d1.

Further, an inner diameter of an inner circumferential surface of the second protruded section 6hn is "ΦB6".

Furthermore, the inner diameter ΦB6 is larger than the second outer diameter ΦB of the second outer circumferential surface 5b2 of the sleeve 5.

Accordingly, the inner circumferential surface of the second protruded section 6hn is separated from the second outer circumferential surface 5b2 of the sleeve 5.

Further, the thickness of the second protruded section 6hn is thinner than that of the first protruded section 6c.

Furthermore, a length in the axis CL direction of the first protruded section 6c from the hitting surface 6d1 to the tip end of the second protruded section 6hn is "d2". In other words, the second protruded section 6hn protrudes downward from the hitting surface 6d1 by the distance "d2".

More, a length Lk in the axis CL direction of the first protruded section 6c is equivalent to a length in the axis CL direction of an area in which the hub 6 engages with the first outer circumferential surface 5b1 of the sleeve 5, wherein the inner circumferential surface 6b of the first protruded section 6c maintains the first outer diameter ΦA within the area. As a matter of fact, the length Lk is an engaging length of the hub 6 with respect to the sleeve 5.

Typical values of the above-mentioned dimensions, for instance, are as follows:

"ΦB6"=11.1 mm, "d2"=0.2 mm, "Lk"=3.4 mm and "d3"= (ΦB−ΦA)/2=0.5 mm.

In reference to FIGS. 3a-4, the forming process of the first protruded section 6c is described in detail next.

FIGS. 3a-3c are cross sectional drawings for explaining each step of forming the first protruded section 6c of the hub 6 through a press working and FIG. 4 is an enlarged cross sectional drawing in part showing a right side of the third step of the forming process through the press working shown in FIG. 3c.

Firstly, as shown in FIG. 3a, a prepared hole 6M1 with centering on an axis CL1 is formed on a sheet metal 6M through a piercing process, and then the sheet metal 6M having the prepared hole 6M1 is sandwiched between female dies 61 and 62 (first step).

Secondly, as shown in FIG. 3b, a burring punch 63 is force fitted into the prepared hole 6M1 in an arrow direction along the center axis CL1 so as to form a protruded section 6M2 (hereinafter referred to as "first protruded section 6M2") through a so-called burring process (second step).

Hereupon, the first and second steps are the same processes as the normal burring process.

Thirdly, as shown in FIG. 3c, the sheet metal 6M having the first protruded section 6M2 is sandwiched between a female die 64 and a male die 65.

More specifically, the female and male dies 64 and 65 securely fasten the sheet metal 6M by sandwiching inner and outer surfaces of the first protruded section 6M2 along its contour between them.

Then, a stepped section (shown as "6d" in FIG. 2) is formed on a tip end surface at an innermost side of the first protruded section 6M2 by punching a male die 66 having an annular punching section 66P into the tip end surface in an arrow D66 direction (third step). In this connection, a tip of the annular punching section 66P is formed in a specific shape that corresponds to the hitting surface 6d1 of the stepped section 6d of the hub 6 shown in FIG. 2.

The punching process makes the tip of the first protruded section 6M2 (6c) result in plastic deformation, and the second protruded section 6hn is formed thereon.

According to the above-mentioned forming process of the second protruded section 6hn, as shown in FIG. 4, the hitting surface 6d1 is formed by punching the tip end surface of the first protruded section 6c (6M2) by means of the male die 66 while both the inner circumferential surface 6b of the first protruded section 6c (6M2) and the top surface 6k1 of the base section 6k are securely fastened by the male die 65.

Accordingly, the forming process can achieve exceptional effect such that dimensions of the first inner diameter ΦA of the inner circumferential surface 6b and a distance Lc from the top surface 6k1 of the base section 6k to the hitting surface 6d1 are formed with a high degree of accuracy.

As a matter of course, since the second protruded section 6hn is formed as relief of the plastic deformation, a distance Ld from a tip end surface 6hn1 of the second protruded section 6hn to the top surface 6k1 results in being formed with a low degree of accuracy. However, there is really very little chance that the second protruded section 6hn contributes to functions of the motor 50, so that the second protruded section 6hn never affects functions or characteristics of the motor 50.

On the contrary, in the case of the Japanese publication of unexamined patent applications No. 2003-338102 and No. 2001-245461 as the prior arts, the projected holding part 1c and the holding section 106 (hereinafter referred to as "protruded section") were just formed by the burring process as the same process as shown in FIG. 3b, so that the tip end portion of the protruded sections 1c and 106 were not restricted in dimensions.

Accordingly, the length in the axial direction of the protruded sections 1c and 106 that corresponds to the distance Lc in FIG. 4 is hardly regulated with a high degree of accuracy, and resulting in failing to achieve the above-mentioned exceptional effect to be realized by the present invention.

In the above-mentioned structure of fixing the hub 6 to the sleeve 5 shown in FIG. 2, the hub 6 is tightly engaged with the sleeve 5 in the radial direction between the first outer circumferential surface 5b1 of the sleeve 5 and the inner circumferential surface 6b of the hub 6 within the range of the distance Lk in the axis CL direction.

Further, the hitting surface 6d1 of the hub 6 tightly contacts with the receiving surface 5c1 of the sleeve 5 in the thrust direction.

Accordingly, the hub 6 can be positioned in extremely higher accuracy with respect to the sleeve 5 in the axis CL direction.

In reference to FIG. 5, a state of loading a disc on the motor 50 according to the first embodiment of the present invention is described next.

FIG. 5 is a cross sectional view of the motor 50 when a disc is loaded thereon.

In FIG. 5, a disc D is a platter having a center hole Da in the center and placed on the sheet 11 of the motor 50, wherein the motor 50 is placed such that the motor base 1 is located at the bottom.

Then the disc D is fixed to the motor 50 by means of a clamper 12.

More specifically, the clamper 12 is produced from aluminum through a cutting process and formed in a ring shape. The shape of the clamper 12 is designed for having some degree of elasticity.

Further, a chamfered corner section 12a is formed at a lower edge section of an outer circumference of the clamper 12. The chamfered corner section 12a contacts with a corner edge of the center hole Da of the disc D.

Furthermore, an inner diameter ΦK of a center hole of the clamper 12 is formed so as to be slightly smaller than the first outer diameter ΦA of the first outer circumferential surface 5b1 of the sleeve 5.

More, the clamper 12 is force fitted or shrink fitted into the circumferential groove 5d of the sleeve 5 and clamps down the disc D placed on the sheet 11 by sandwiching the disc D between the clamper 12 and the sheet 11.

When the disc D is clamped down by the clamper 12, a top corner edge 12b of an inner circumference of the clamper 12 contacts with the slanted wall surface 5d1 of the circumferential groove 5d, and resulting in automatically centering the clamper 12. The disc D is also centered automatically as the clamper 12 is automatically centered.

When the clamper 12 is installed on the sleeve 5, downward force F1 is applied to the hub 6 through the disc D and the sheet 11. However, since the hitting surface 6d1 of the hub 6 tightly contacts with the receiving surface 5c1 of the sleeve 5 as mentioned above, the hub 6 never moves downward toward the motor base 1 side.

In other words, the location of the hub 6 in the axis CL direction is maintained in position with a high degree of accuracy.

Second Embodiment

In reference to FIG. 5, a motor adopting an improved mechanism according to a second embodiment of the present invention is described next.

Figure 6:
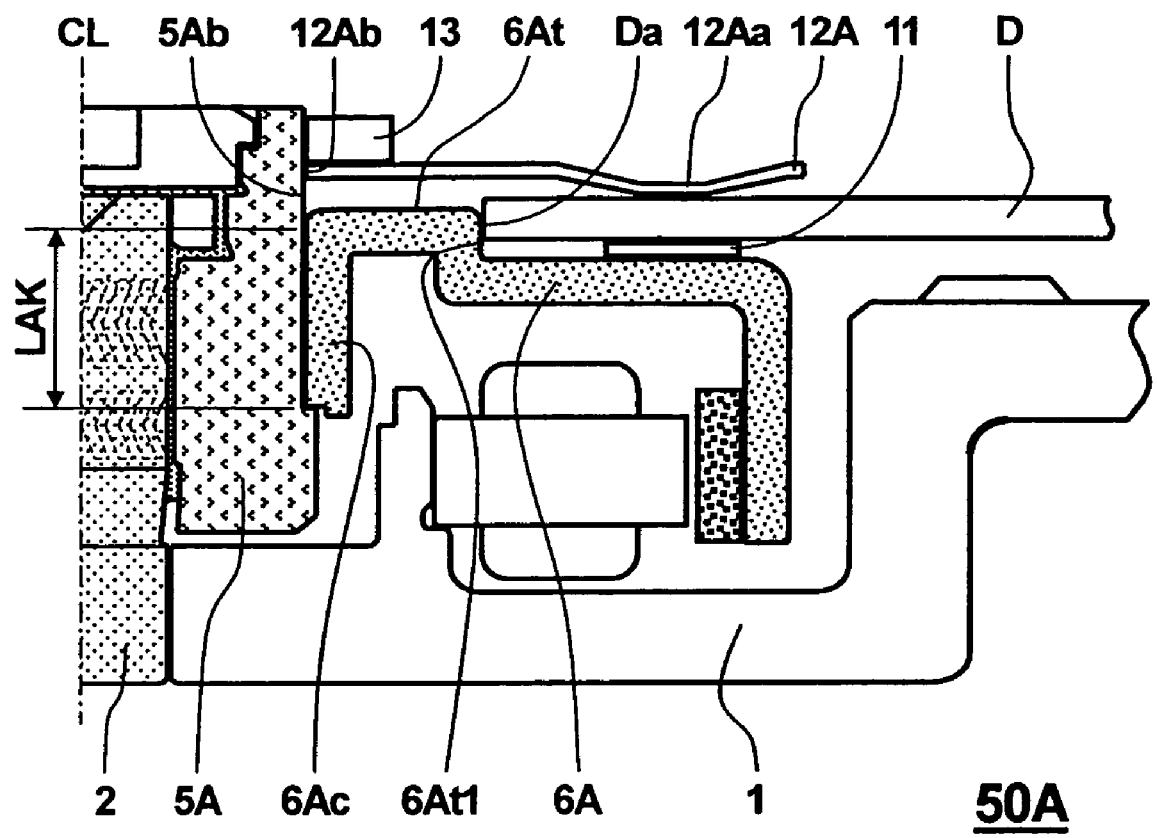
FIG. 6 is a cross sectional view of a motor adopting an improved mechanism according to a second embodiment of the present invention showing a disc loaded thereon.
Figure 7:
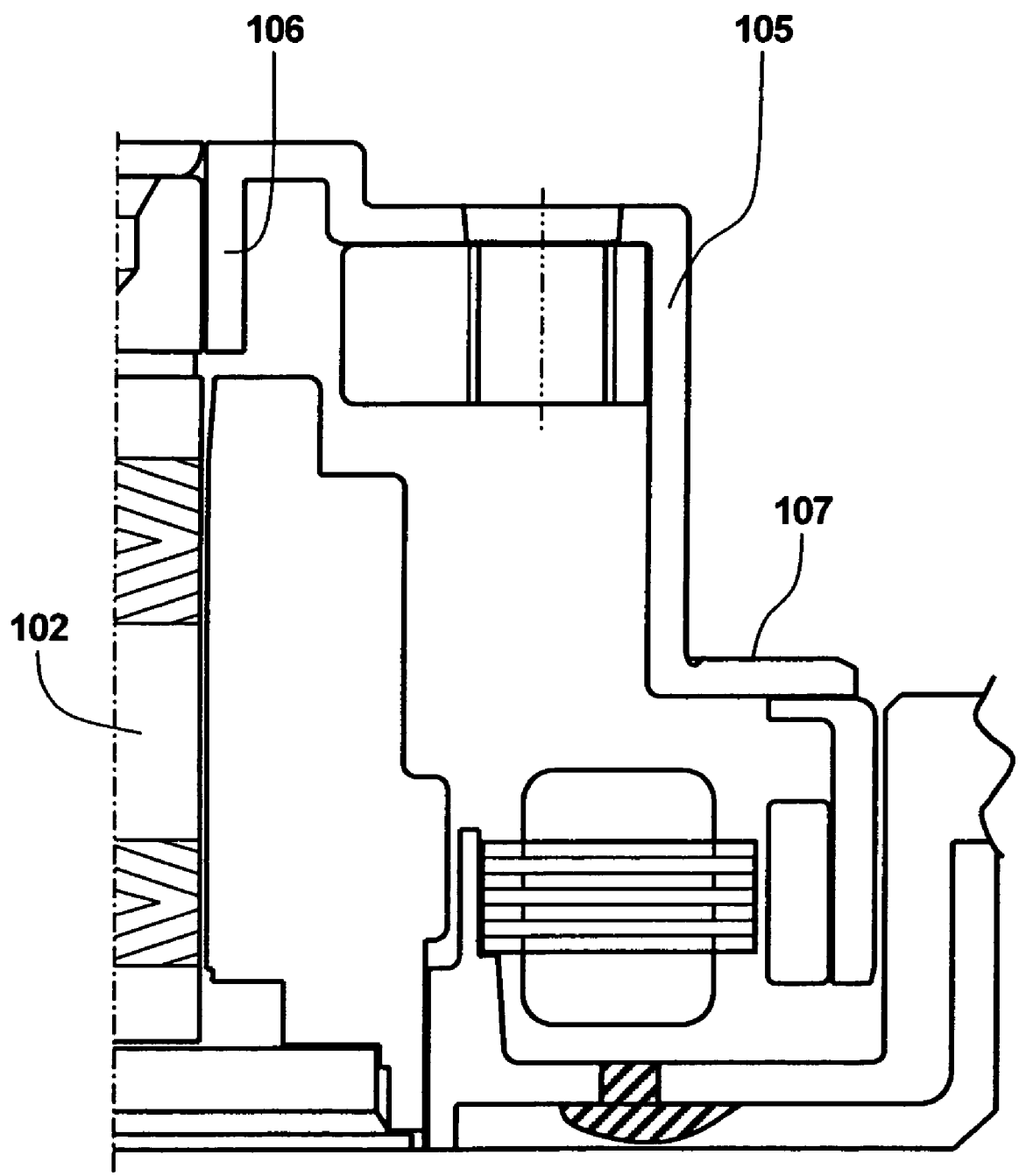
FIG. 7 is a cross sectional view of a conventional motor according to a prior art.

FIG. 6 is a cross sectional view of a motor 50A according to a second embodiment of the present invention showing a disc loaded thereon.

The motor 50A according to the second embodiment of the present invention is identical to the motor 50 according to the first embodiment of the present invention except for the sleeve 5, the hub 6 and a clamping mechanism for a disc. Therefore, the same components as the motor 50 are denoted by the same reference signs and their descriptions are omitted.

In FIG. 6, a sleeve 5A and a hub 6A of the motor 50A according to the second embodiment of the present invention are different in their shapes from the sleeve 5 and the hub 6 of the motor 50 according to the first embodiment of the present invention.

Further, a shape and a material of a clamper 12A for clamping a disc D is also different from the clamper 12 of the motor 50.

More specifically, the sleeve 5A of the motor 50A is not provided with the circumferential groove 5d on an outer circumferential surface of the sleeve 5A.

Further, the hub 6A is provided with a raised section 6At, which tightly engages with a center hole Da of the disc D without any rattling.

Furthermore, an outer circumferential surface 6At1 of the raised section 6At of the hub 6A tightly engages with the center hole Da of the disc D, and resulting in centering the disc D.

On the other hand, the clamper 12A according to the second embodiment of the present invention is produced from a metal thin plate having springiness and provided with a center hole 12Ab that engages with the sleeve 5A and a recessed section 12Aa that is dented circumferentially. One example of a material for the clamper 12A is a stainless steel material having a thickness of 0.6 mm.

The clamper 12A that engages with the sleeve 5A is depressed by a stop ring 13 so as not to come out from the sleeve 5A. The stop ring 13 is force fitted on an outer circumferential surface 5Ab of the sleeve 5A and fixed thereto in such a way that the recessed section 12Aa of the clamper 12A contacts with the disc D and depress the disc D downward.

Further, the position of the recessed section 12Aa contacting with the disc D is designated to be a position on the disc D opposite to the sheet 11 affixed on the hub 6A so as not to warp the disc D.

According to the clamping mechanism of the motor 50A based on the second embodiment of the present invention, it is not necessary for the sleeve 5A to be provided with a circumferential groove, so that the sleeve 5A can be manufactured in lower cost.

Further, a length LAK of a first protruded section 6Ac of the hub 6A that is a range of engaging the first protruded section 6Ac with the sleeve 5A in the axis CL direction can be enlarged by an amount of protrusion of the raised section 6At. In other words, the raised section 6At can enlarge an engaging length (LAK).

Accordingly, fixing strength of the hub 6A against the sleeve 5A can be improved furthermore.

As mentioned above, according to the present invention, a motor can be thinned in thickness and lowered in price.

Further, the motor achieves excellent effects such that dynamic characteristics of the motor never diminished, life of the motor never shortened and a disc loaded on the motor is positioned in the axial direction with a high degree of accuracy.

While the invention has been described above with reference to a specific embodiment thereof, it is apparent that many changes, modifications and variations in configuration, materials and the arrangement of equipment and devices can be made without departing from the invention concept disclosed herein.

For instance, a method of forming the hitting surface 6d1 in the second protruded section 6d of the hub 6 or 6A is not limited to the above-mentioned press working. In the case of the hub 6 as a representative of the hubs 6 and 6A hereinafter, the hitting surface 6d1 can be formed through a cutting process in such a way that the outer circumference of the tip of the first protruded section 6c is cut off based on the top surface 6k1 or a bottom surface of the base section 6k of the hub 6 after the first protruded section 6c is formed by the burring process. By the cutting process, the location in the axis CL direction of the hitting surface 6d1 can be positioned with a high degree of accuracy.

Further, the hub 6 can be produced from a metal block through a cutting process totally. In this case, the location in the axis CL direction of the hub 6 can be positioned with a high degree of accuracy by contacting the hitting surface 6d1 of the hub 6 formed through the cutting process with the receiving surface 5c1 of the sleeve 5.

In any cases, however, there is fear that forming the hub 6 through the cutting process raises manufacturing cost of the hub 5.

Accordingly, it is desirable for the hitting surface 6d1 of the hub 6 to be formed through the above-mentioned press working from the viewpoint of suppressing the rise of manufacturing cost.

In addition thereto, it will be apparent to those skilled in the art that various modifications and variations could be made in the bearing device and the motor mounted with the bearing device in the present invention without departing from the scope of the invention.

What is claimed is:

1. A method of manufacturing a motor adopting an improved mechanism for driving a disc, the motor comprising:
   a hub for loading a disc; and
   a sleeve for fixing the hub,
   the method comprising the steps of:
   (a) forming on the outer circumferential surface of the sleeve a first outer circumferential surface having a first diameter, a second outer circumferential surface having a second diameter that is larger than the first diameter, and a receiving surface that links the first outer circumferential surface and the second outer circumferential surface, the receiving surface lying along a plane that intersects at right angles with an axis of revolution of the sleeve,
   (b) manufacturing the hub, the step of manufacturing the hub further comprising the steps of:
   (1) forming a hole in a metal plate;
   (2) applying a burring process to the hole along a center axis of the hole in a direction opposite to a surface of the metal plate to be loaded with a disc to form a protruded section having a cylindrical shape; and
   (3) forming a hitting surface at the protruded section by punching a tip end portion of the protruded section with an annular punch of a male die while the protruded section is securely fastened between a female die and a male die from both the outer and inner surfaces of the protruded section; and
(c) fixing the hub on the sleeve by inserting the first outer circumferential surface of the sleeve into the protruded section of the hub until the receiving surface of the sleeve contacts the hitting surface of the hub.

2. The method of manufacturing a motor as claimed in claim 1, wherein the step of forming a hitting surface is characterized in that a thin-walled section is formed on an outer circumferential side of the protruded section by punching only on an inner circumferential side of a tip end portion surface of the protruded section.

3. The method of manufacturing a motor as claimed in claim 1, wherein the step of fixing the hub on the sleeve is characterized in that the hub is fixed to the first outer circumferential surface of the sleeve by a process of a combination of gluing and force fitting.

\* \* \* \* \*